United States Patent [19]
Johnson

[11] 3,902,580
[45] Sept. 2, 1975

[54] ONE-WAY CLUTCH
[75] Inventor: Lawrence P. Johnson, Huron, Ohio
[73] Assignee: General Motors Corporation, Detroit, Mich.
[22] Filed: Mar. 25, 1974
[21] Appl. No.: 454,085

[52] U.S. Cl. .................................................. 192/45
[51] Int. Cl. ............................................. F16d 41/06
[58] Field of Search .................... 192/45; 188/82.84

[56] References Cited
UNITED STATES PATENTS

| | | | |
|---|---|---|---|
| 2,843,238 | 7/1958 | Rozner | 192/45 |
| 3,339,687 | 9/1967 | Cowles | 192/45 |
| 3,404,760 | 10/1968 | Benson et al. | 192/45 |
| 3,732,956 | 5/1973 | Johnson et al. | 192/45 |

*Primary Examiner*—Allan D. Herrmann
*Attorney, Agent, or Firm*—F. J. Fodale

[57] ABSTRACT

A one-way clutch is unitized in assembly with inner and outer races for handling during shipment by a cage which retains the rollers, biasing springs and plastic blocks for centering the races. The sheet metal cage also positively retains the races axially in one direction thus making it unnecessary for the environmental structure of the more comprehensive assembly in which the clutch is ultimately assembled to axially retain one of the races in one direction. The cage may economically be manufactured from sheet metal by simple stamping and bending operations.

3 Claims, 9 Drawing Figures

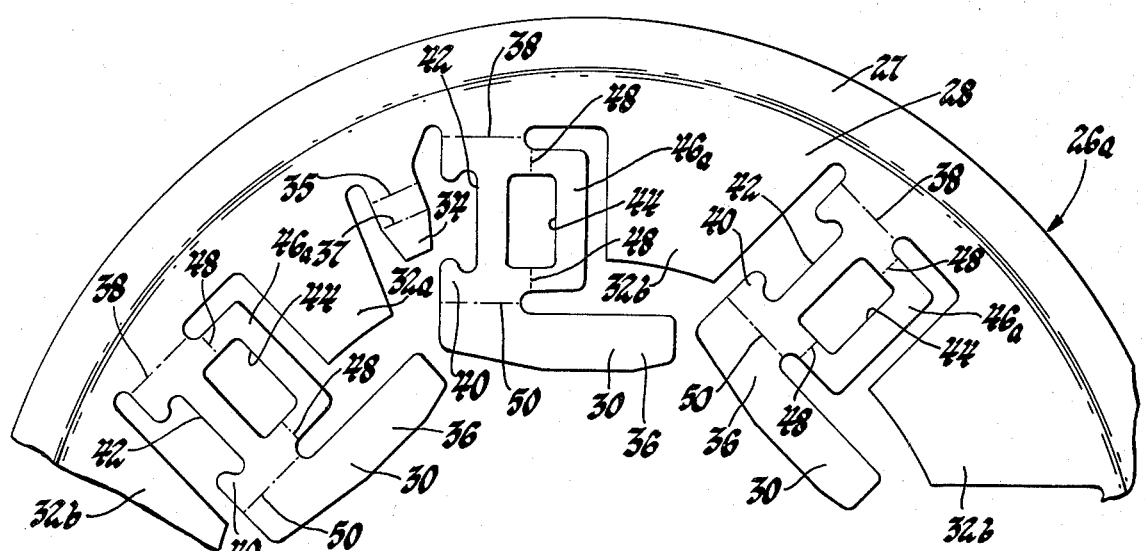
Fig.6
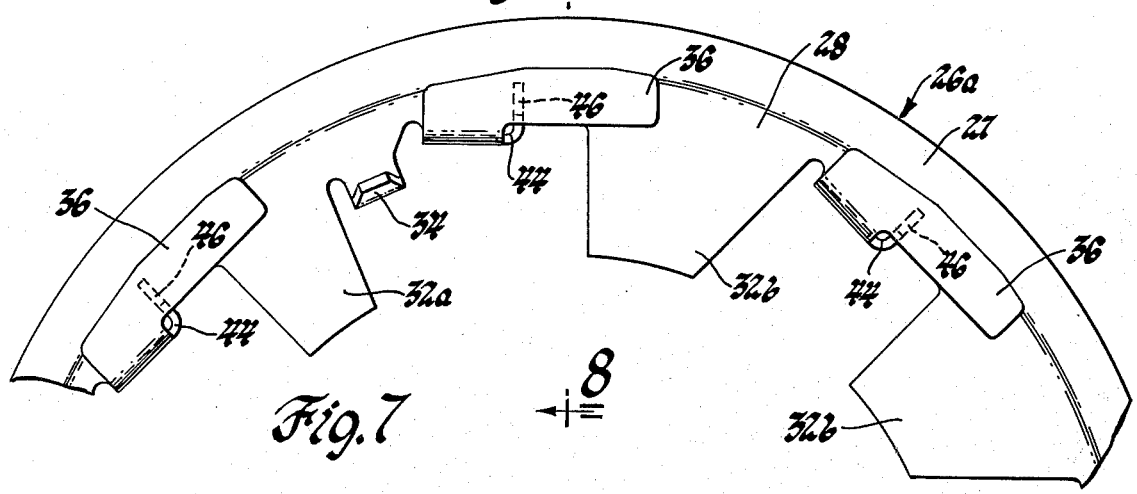
Fig.7
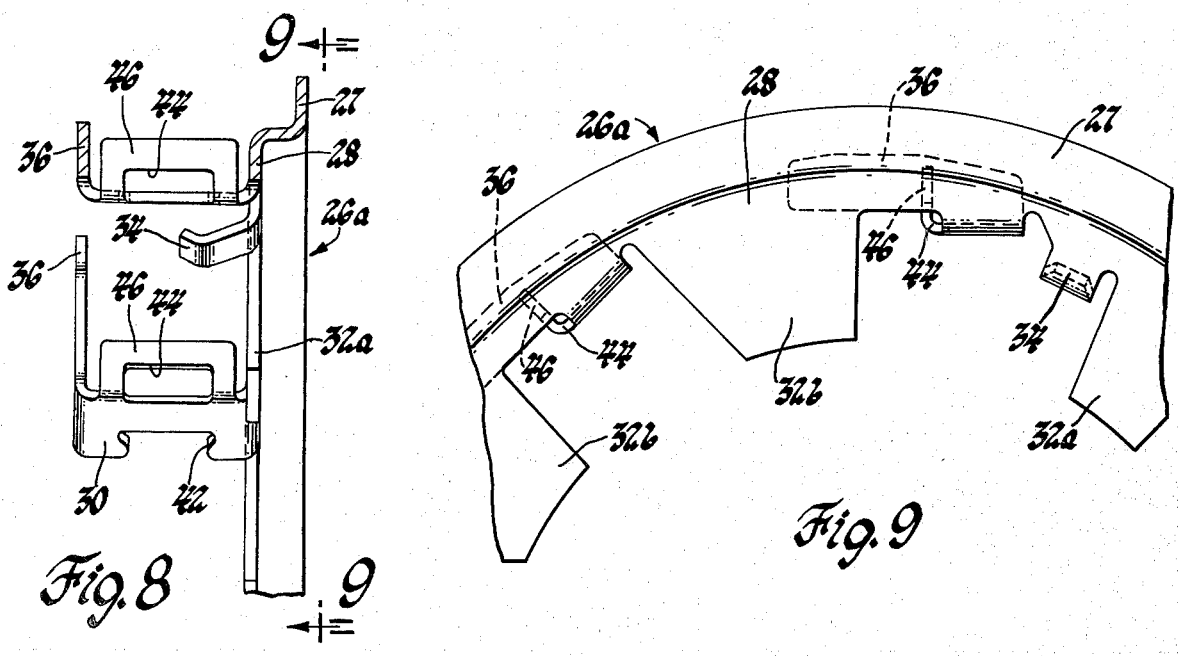
Fig.8
Fig.9

ONE-WAY CLUTCH

This invention relates generally to one-way clutches and more particularly to one-way clutches which have a cage operatively associated with wedging elements, such as rollers, which prevent or limit relative rotation between the races in one direction.

One-way clutches with cages are often manufactured at one place and shipped to another for incorporation into a more comprehensive operational assembly, for example, a transmission. In operation, each of the clutch races must be axially retained in both directions by some structure which is either a part of the operational assembly or the clutch itself.

The U.S. Pat. No. 2,843,238 issued to J. J. Rozner on July 15, 1958 for a "One-Way Clutch" discloses a one-way clutch with a cage in which one race is positively retained in both axial directions with respect to the other race thus making it unnecessary for the structure of the operational assembly to axially retain one of the races in either direction. The Rozner clutch assembly, however, requires an extra housing member, spacing pieces and snap rings. These extra parts in effect could be considered as much as a part of the operational assembly in which the Rozner clutch is incorporated (as they could be considered a part of the Rozner clutch) and thus the incorporation of the Rozner clutch into the operational assembly is not any simpler than the incorporation of those clutches in which both races are axially retained by the structure of the operational assembly from the standpoint of the number of parts involved.

In its broadest aspect, the object of this invention is to provide a one-way clutch having a one-piece sheet metal cage which retains the races in one direction. The one-way clutch may then more simply be incorporated into a more comprehensive assembly such as an automatic transmission from the standpoint of the number of parts involved since it is not necessary for the environmental structure of the more comprehensive assembly to axially retain one of the races in both directions.

Another object of this invention is to provide a one-way clutch in which the races are axially retained in one direction by the cage and in which the outer race is centered on the inner race while maintaining a minimum width of the bearing races which latter feature per se is known from the U.S. Pat. No. 3,732,956 granted on May 15, 1973 for an "Overrunning Clutch With Centering Means and Unit Handled Subassembly Therefor" which patent is assigned to the assignee of this invention.

Another object of this invention is to provide a one-way clutch in which a sheet metal cage manufactured from simple stamping and bending operations, such as the cage disclosed in the U.S. Pat. No. 2,973,847 issued to T. R. Stockton on Mar. 7, 1961, but which cage has the additional feature of axially retaining the rollers in both directions and the races in one direction to facilitate handling of the clutch during shipment and subsequent assembly into a more comprehensive assembly.

Other objects and features of the invention will become apparent to those skilled in the art as the disclosure is made in the following detailed description of a preferred embodiment of the invention as illustrated in the accompanying sheets of drawings in which:

FIG. 6 is a fragmentary plan view of a sheet metal stamping which may be used to manufacture the cage shown in FIG. 1.

FIG. 7 is a fragmentary front view of the cage shown in FIG. 1 which has been manufactured using the sheet metal stamping shown in FIG. 6.

FIG. 8 is a section taken along the line 8—8 of FIG. 7.

FIG. 9 is a view taken along the line of 9—9 of FIG. 8.

Figure 1:
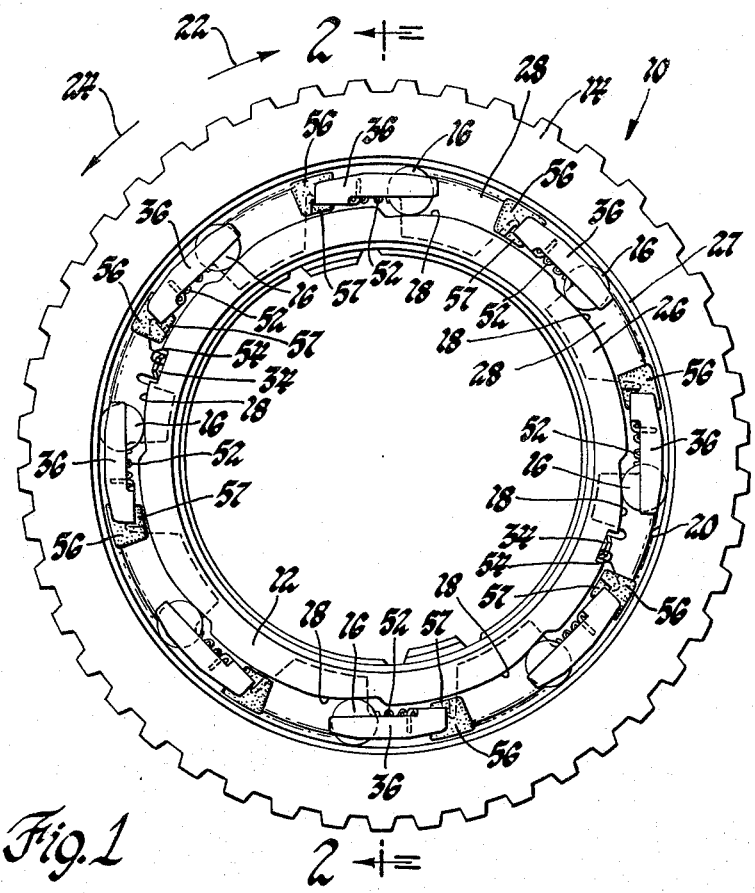
FIG. 1 is a front view of a one-way clutch in accordance with this invention.

Referring now to the drawings and more particularly to FIG. 1, this invention is embodied in a one-way clutch 10 comprising an inner race 12 and an outer race 14 having a plurality of rollers 16 disposed therebetween. The rollers 16 engage cam surfaces 18 of the inner race 12 and an inner cylindrical surface 20 of the outer race 14 for preventing relative rotation of the races in one direction while allowing freewheeling or overrunning in the other. For instance, in the clutch 10 illustrated in FIG. 1, the rollers 16 prevent the outer race 14 from rotating in the clockwise direction relative to the inner race 12 as indicated by the arrow 22. On the other hand, the outer race 14 is freely rotatable with respect to the inner race 12 in the counterclockwise direction as indicated by the arrow 24.

The races 12 and 14 and the rollers 16 are retained in a unit-handled assembly by a cage 26 which is generally annular in form and is fabricated from sheet metal by stamping and bending operations. Economical manufacture of the cage 26 is an important feature of this invention and thus an example of how the cage may be manufactured from sheet metal stock will now be briefly described in connection with FIGS. 6 thru 9 before proceeding to a detailed description of the cage structure and cooperation with other parts of the one-way clutch 10.

FIG. 6 shows a generally annular sheet metal stamping 26a which in this particular instance has an offset continuous outer flange 27 but is otherwise flat. The cage 26 may be manufactured simply by bending various flat portions of the stamping 26a. More specifically, the stamping 26a has an end ring portion 28 (inside the offset flange 27) and an irregular inner marginal portion comprising a plurality of circumferentially spaced fingers 30 alternating with a plurality of circumferentially spaced radial tongues which are either like those identified as 32a or 32b. The difference is that the tongues 32a are narrower than the tongues 32b and a depending tab 34 is located between each tongue 32a and the finger 30 on one side of the tongue 32a. The number of the narrower tongues 32a and tabs 34 used in place of the tongues 32b is a matter of choice as explained hereinafter. The fingers 30 have elongated segments 36 at their free ends which before bending the stamping 26a are radially spaced from the free ends of the tongues 32 and tabs 34 in order to maximize the length of the elongated segments 36 for roller retainment. The elongated segments 36 are preferably disconnected and the fingers 30 have two spaced necks to facilitate the three perpendicular bends required along the lines shown in phantom at 38, 50 and 48 to form the fingers 30 into their proper shape. The first necks by means of which the fingers 30 are attached to the end ring portion 28 of stamping 26a facilitate bending the fingers 30 perpendicularly to the end ring portion 28 along the bend lines shown in phantom at 38. The second necks by means of which the elongated segments 36 are attached to the fingers 30 and the disconnected feature of the elongated segments 36 facilitate bending the elongated segments 36 perpendicularly to the fingers 30 along the bend lines shown in phantom at 50.

Figure 3:
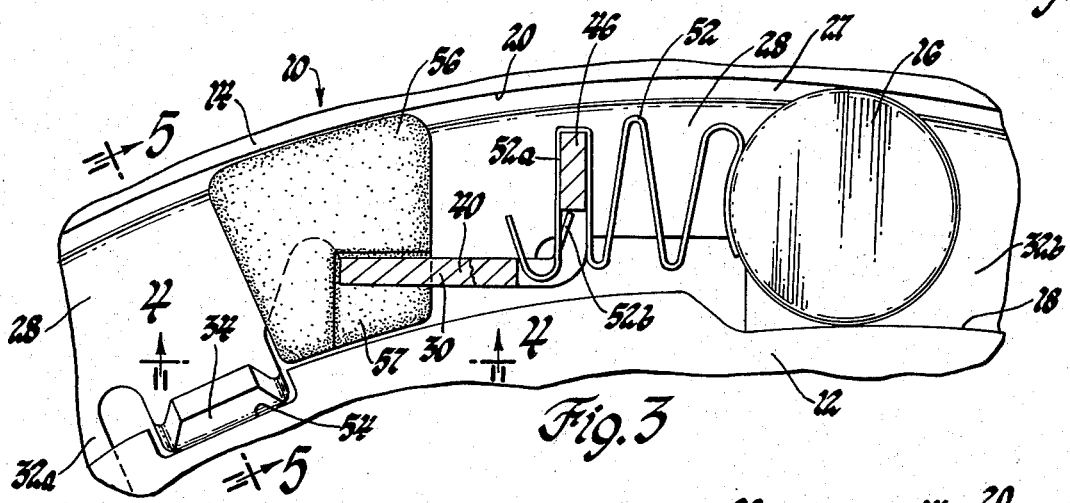
FIG. 3 is an enlargement of a portion of FIG. 1 with part of the cage removed to illustrate internal details of the cage.
Figure 4:
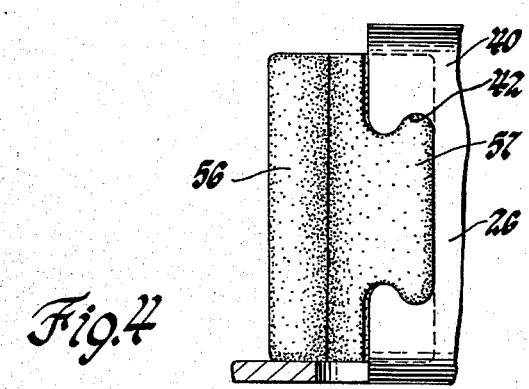
FIG. 4 is a section taken along the line 4—4 of FIG. 3.

Each of the fingers 30 has a key slot 42 at one circumferential end and a rectangular hole 44 adjacent the opposite circumferential end. The circumferential end portion 46a of each finger 30 at the hole end is not connected by the necks to either the end ring portion 28 or the elongated segments 36 to facilitate bending the end portions perpendicularly to the portions 40 of the fingers 30 along the bend lines shown in phantom at 48 to upright spring attachments 46. See particularly FIGS. 3 and 8.

The depending tongues 32a and 32b preferably remain coplanar with the end ring portions 28 and require no bending. The tabs 34 are bent generally perpendicularly to the end ring portion 28 into a shallow V configuration along the two bend lines shown in phantom at 35 and 37.

While the above description has been brief, it is considered sufficient to enable anyone skilled in the art to fabricate the cage from the stamping 26a just described simply by bending the various flat portions of the stamping along the bend lines described. The sequence of bending operations may vary in many instances depending upon the equipment available and the choices made by the tool designer, nevertheless, the underlying principles will remain the same. It should likewise be pointed out that the stamping 26a need not necessarily have an offset outer flange 27 which in the particular embodiment disclosed is present merely to accommodate an outer race 14 which is wider than the inner race 12 for reasons not required by this invention.

FIGS. 7, 8 and 9 show the cage 26 which has been made from the stamping shown in FIG. 6. The three perpendicular bends in the fingers 30 result in the fingers 30 extending axially in a cantilevered fashion from the radially disposed end ring 28 and having radially disposed elongated segments 36 at their free ends forming open ended chambers for the rollers and further having upright spring attachments 46 within the chambers for mounting springs which individually engage the rollers.

The two bends in the tabs 34 result in the tabs 34 having a shallow V configuration and extending generally axially in a cantilevered fashion from the radially disposed end ring 28.

Figure 2:
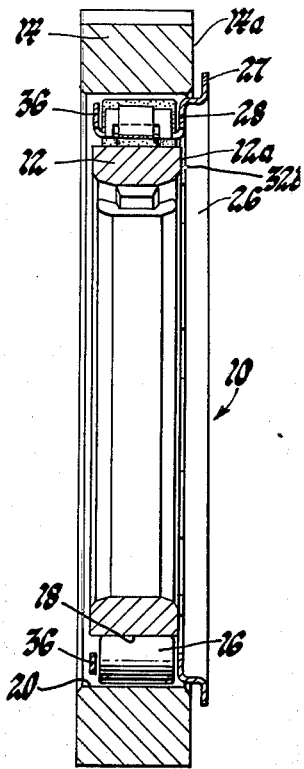
FIG. 2 is a section taken substantially along the line 2—2 of FIG. 1.

Returning now to FIGS. 1 thru 5, the cooperation of the cage 26 with the remaining parts of the clutch 10 will now be explained. The cage 26 is disposed with respect to the concentric races 12 and 14 such that fingers 30 are disposed therebetween and the tongues 32a and 32b abut a radial face 12a of the inner race 12 positively retaining the inner race 12 in one direction, that is, toward the right as viewed in FIG. 2. The flange 27 lies adjacent the radial face 14a of the outer race 14 and likewise positively retains the outer race 14 in the same direction.

Figure 5:
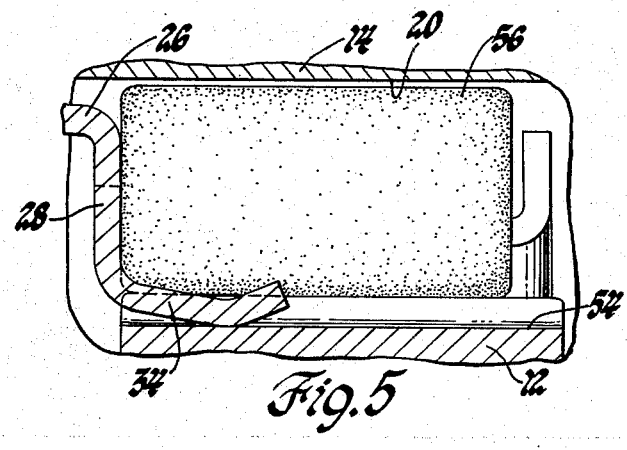
FIG. 5 is a section taken along the line 5—5 of FIG. 3.

The rollers 16 are disposed between the end ring 28 and the elongated end segments 36 and are thus retained in both axial directions. The clutch 10 carries accordion shaped tickler springs 52 which individually engage and bias each roller 16 into incipient wedging engagement between the races 12 and 14. The springs 52 incorporate U-shaped clips 52a and resilient lock fingers 52b by means of which the springs 52 are mounted on the upright spring attachments 46. See particularly FIG. 3 where one of the elongated end segments 36 has been removed to show the spring mounting detail. The reaction of the springs 52 received by the cage 26 is grounded to the inner race 12 by the tabs 34 which are disposed in slots 54 in the inner race 12. For this purpose, only one tab 34 and cooperating slot 54 are necessary. However, it is preferable to provide at least two tabs 34 and cooperating slots 54 and to configure the tabs 34 so that they have a slight interference fit with the bottom walls of the slots 54 as best shown in FIG. 5. During handling, the tongues 32a and 32b and the flange 27 provide positive retention of the races 12 and 14 in one direction while the wedging engagement of the rollers with the races under the influence of the springs 52 provide frictional retention in the other direction. The axial retention of the inner race 12 in this other direction is improved by the slight interference fit of the tabs 34. This is a desirable feature because the clutch is built-up from the inner race 12 and it is preferable to maintain the tongues 32a and 32b in abutment with the face 12a during build up, handling and assembly of the clutch 10 into a more comprehensive assembly.

The clutch 10 also includes molded plastic bearing blocks 56 which center the outer race 14 on the inner race 12. These bearing blocks incorporate integrally molded keys 57 which are disposed in the key slots 42 of the cage finger portions 40 and thus are retained in assembly with the other parts of the clutch 10 by the cage 26. See particularly FIG. 4.

The clutch 10 is assembled in the following manner. The inner race 12 is first inserted into the cage 26 with the tabs 34 serving to properly orient the inner race 12 and retain it against the tongues 32a and 32b. Next the bearing blocks 56, springs 52 and rollers 16 are radially inserted into the cage from the outside direction and placed in their proper operative positions within the cage. Through use of a suitable fixture the bearing blocks are held against the inner race and the rollers are held in a down ramp position slightly compressing the springs, while the subassembly is inserted into the outer race 14 to complete the clutch 10.

I wish it to be understood that I do not desire to be limited to the exact details of construction shown and described, for obvious modifications will occur to a person skilled in the art.

I claim:

1. A one-way clutch comprising:
    inner and outer concentrically disposed races,
    a plurality of circumferentially spaced rollers disposed between said races and engaging cam surfaces on one of said races for preventing relative rotation between said races in one direction,
    a unitary sheet metal cage having an end ring disposed adjacent one end of said rollers for axially retaining said rollers in one direction and a plurality of fingers extending axially from said end ring,
each of said fingers having a circumferentially elongated end segment at the free end thereof, said end segments having portions disposed adjacent the opposite ends of said rollers for axially retaining said rollers in the opposite direction,
spring means mounted on said fingers biasing said rollers into wedging engagement with said cam surfaces and the other of said races, and
means to limit relative rotation between said cage and said one race,
said end ring having inner and outer marginal portions juxtaposed to radial faces of said inner and outer races respectively for axially retaining said races in one direction, one of said inner and outer marginal portions being a plurality of radially depending tongues.

2. A one-way clutch comprising:
inner and outer concentrically disposed races,
a plurality of circumferentially spaced rollers disposed between said races and engaging cam surfaces on one of said races for preventing relative rotation between said races in one direction,
a unitary sheet metal cage having a radially disposed end ring engageable with the ends of said rollers for axially retaining said rollers in one direction and a plurality of fingers bent axially from said end ring, each of said fingers having a circumferentially elongated end segment bent radially therefrom,
said end segments having flat portions engageable with the opposite ends of said rollers for axially retaining said rollers in the opposite direction,
bearing means mounted on said fingers engaging and centering said races,
spring means mounted on said fingers biasing said rollers into wedging engagement with said cam surfaces and the other of said races, and
means to limit relative rotation between said cage and said one race,
said end ring having a plurality of depending radial tongues at one marginal portion thereof engageable with a radial face of said one race for axially retaining said one race in one direction and a continuous flange at the other marginal portion thereof engageable with a radial face of said other race for axially retaining said other race in said one direction.

3. A one-way clutch comprising:
inner and outer concentrically disposed races,
a plurality of circumferentially spaced rollers disposed between said races and engaging cam surfaces on one of said races for preventing relative rotation between said races in one direction,
a unitary sheet metal cage having a radially disposed end ring engageable with the ends of said rollers for axially retaining said rollers in one direction and a plurality of fingers bent axially from said end ring,
each of said fingers having a key slot and an upright spring attachment at the opposite circumferential ends thereof and a circumferentially elongated end segment bent radially therefrom,
said end segments having flat portions engageable with the oppostie ends of said rollers for axially retaining said rollers in the opposite direction,
bearing blocks disposed between said end ring and said end segments, said bearing blocks having keys disposed in said key slots and inner and outer surfaces engaging said inner and outer races respectively for centering said races, and
spring means mounted on said upright spring attachments of said fingers and biasing said rollers into wedging engagement with said cam surfaces and the other of said races,
said end ring having a plurality of tabs bent axially therefrom and disposed in slots in said one race for limiting relative rotation between said cage and said one race,
said end ring having a plurality of depending coplanar radial tongues at one marginal portion thereof engageable with a radial face of said one race for axially retaining said one race in one direction and a continuous flange at the other marginal portion thereof engageable with a radial face of said other race for axially retaining said other race in said one direction, and said tabs frictionally engaging bottom walls of said slots to inhibit separation of said one race from said cage in the other direction.

* * * * *